(12) United States Patent
Goreaud et al.

(10) Patent No.: US 10,354,767 B2
(45) Date of Patent: Jul. 16, 2019

(54) METHODS FOR SIMULATING THE FLOW OF A FLUID IN A VESSEL OF A NUCLEAR REACTOR AND FOR CALCULATING THE MECHANICAL DEFORMATION OF ASSEMBLIES OF A NUCLEAR REACTOR CORE, AND ASSOCIATED COMPUTER PROGRAM PRODUCTS

(71) Applicant: AREVA NP, Courbevoie (FR)

(72) Inventors: Nicolas Goreaud, Lyons (FR); Benjamin Chazot, Lyons (FR); Jérémy Galpin, Paris (FR); Hubert Salaün, Lyons (FR); Elodie Mery De Montigny, Lyons (FR)

(73) Assignee: AREVA NP, Courbevoie (FR)

( * ) Notice: Subject to any disclaimer, the term of this patent is extended or adjusted under 35 U.S.C. 154(b) by 283 days.

(21) Appl. No.: 14/782,770

(22) PCT Filed: Apr. 4, 2014

(86) PCT No.: PCT/EP2014/056876
§ 371 (c)(1),
(2) Date: Oct. 6, 2015

(87) PCT Pub. No.: WO2014/166847
PCT Pub. Date: Oct. 16, 2014

(65) Prior Publication Data
US 2016/0042823 A1    Feb. 11, 2016

(30) Foreign Application Priority Data

Apr. 10, 2013    (FR) ...................................... 13 53247

(51) Int. Cl.
*G21D 3/00*    (2006.01)
*G06F 17/18*    (2006.01)

(52) U.S. Cl.
CPC ............. *G21D 3/001* (2013.01); *G06F 17/18* (2013.01); *G21D 3/005* (2019.01); *Y02E 30/40* (2013.01)

(58) Field of Classification Search
CPC .. G21D 3/001; G21D 2003/005; G06F 17/18; Y02E 30/40
(Continued)

(56) References Cited

U.S. PATENT DOCUMENTS 5,638,413 A    6/1997    Uematsu et al.
6,434,495 B1   8/2002    Kitamura et al.
(Continued)

FOREIGN PATENT DOCUMENTS

CN    102265042 A    11/2011
CN    102999617 A    3/2013
(Continued)

OTHER PUBLICATIONS

International Search Report for PCT/EP2014/056876.
(Continued)

*Primary Examiner* — Eunhee Kim
(74) *Attorney, Agent, or Firm* — Davidson, Davidson & Kappel, LLC

(57) ABSTRACT

A method for simulating the flow of a fluid in a vessel of a nuclear reactor is provided. The nuclear reactor includes the vessel and a core inside the vessel, the core including nuclear fuel assemblies, each one extending in an axial direction, including nuclear fuel rods and a grid for maintaining the rods, and being spaced apart from another by a clearance between the grids in a transverse direction.

This method for simulating a fluid flow in the vessel of a nuclear reactor includes determining of head loss coefficients in the core, and computing the fluid pressure and speed component(s) in the core using the equation: $\nabla P = -$
(Continued)

K×V where P is the component of the fluid pressure, K is a matrix including the determined head loss coefficients, and V is a vector including the fluid speed component(s).

A transverse head loss coefficient in the assemblies is determined from a transverse Reynolds number, and an axial head loss coefficient in the clearance is from the dimension of the clearance in the transverse direction.

15 Claims, 9 Drawing Sheets

(58) Field of Classification Search
USPC .................................................. 703/2, 12
See application file for complete search history.

(56) References Cited

U.S. PATENT DOCUMENTS

| | | | |
|---|---|---|---|
| 2008/0234989 | A1 | 9/2008 | Saeki et al. |
| 2010/0161250 | A1 | 6/2010 | Tanju et al. |
| 2015/0228363 | A1* | 8/2015 | Dewan .................. G21C 5/02 376/458 |
| 2015/0352601 | A1 | 12/2015 | Gercke et al. |
| 2016/0042823 | A1 | 2/2016 | Goreaud et al. |

FOREIGN PATENT DOCUMENTS

| | | |
|---|---|---|
| CN | 103020398 A | 4/2013 |
| JP | H02290596 A | 11/1990 |
| JP | H06195425 | 7/1994 |
| JP | H08180093 A | 7/1996 |
| JP | 2000112516 | 4/2000 |
| JP | 2005020027 | 1/2005 |
| JP | 2008230089 | 10/2008 |
| JP | 2016506862 A | 3/2016 |
| KR | 100957061 B1 | 5/2010 |
| WO | WO2014166847 A1 | 10/2014 |

OTHER PUBLICATIONS

Zeses Karoutas etc., "Evaluating PWR Fuel Performance Using Vessel CFD Analysis'" Proceedings of 2010 LWR Fuel Performance/TopFuel/WRFPM, Orlando, Florida, USA, Sep. 26-29, 2010, Paper 017, pp. 1-8.

Mitsubushi Atomic Power Industries, Inc., "THINC-IV Summary of Code", MAPI-1044, Mar. 1976, pp. 1-37.

Mitsubishi Atomic Power Industries, Inc., "Overview of THINC-III Summary of Code", MAPI-1072, Aug. 1984, pp. 1-28.

Satoshi Imura et al., "The Development on the 3D Kinetics, Thermal Hydraulics and Plant System Transient Code Sparkle", $13^{th}$ International Conference on Nuclear Engineering, May 16-20, 2005 ICONE, pp. 1-8.

Hikaru Sakamoto et al., "3D Coupled Code Sparkle—2 for PWR Non-Loca Analysis", Proceeding of the 2012 $20^{th}$ International Conference on Nuclear Engineering Collocated with the ASME 2012 Power Conference ICONE20-Power 2012, Jul. 30-Aug. 3, 2012, pp. 1-8.

Yasuhara Michiru, Hisaaki Daiguji, "Numerical Fluid Dynamics-Basics and Application", University of Tokyo Press Foundation, Apr. 1, 1999 ( $8^{th}$ Edition), pp. 497-499, pp. 1-16.

Satoru Ushijima et al., "Proposal of Analysis Method for Zoning Fluid with Generalized Coordinate System and Study of its Basic Features", Annual Journal of Hydraulic Engineering JSCE, vol. 44, Feb. 2000, pp. 1-19.

Japan Nuclear Cycle Development Institute (JNC), O-Arai Engineering Center, "Coupling Analysis of Bundle Deformation and Thermal Hydraulic in Fuel Pin Bundle using BAMBOO (the fuel assembly distortion analysis code) and ASFRE (thermal hydraulics analysis code)—IV codes", Mar. 2004, pp. 1-59.

Dominion Fleet Report DOM-NAF-2, rev. 0.2-NP-A, "Reaction Core Thermal-Hydraulics Using the VIPRE-D Computer code", Nuclear Analysis and fuel Nuclear Engineering, Aug. 2010, pp. 1-255.

Toshio Kobayashi, (a chief of editing members), "Numerical Fluid Dynamics Handbook", Maruzen Publishing, Co., Ltd., pp. 1-10.

Yoshike Matsushita et al., "Numerical Fluid Dynamics" [the $2^{nd}$ edition], pp. 1-13.

Kazuo Ikeda et al., "Study of Spacer Grid Span Pressure Loss Under High Reynolds Number Flow Condition", Proceedings of the $17^{th}$ International Conference on Nuclear Engineering ICONE17, Jul. 12-16, 2009, pp. 1-12.

"Mechanical Engineering Handbook/Basic Edition", "11.2 Pipe friction coefficient of straight pipes," edited by the Japan Society of Mechanical Engineers (JSM), 2007, p. 1-7.

Mitsubishi Atomic Power Industries, Inc., "Thermal-Hydraulic Design and Evaluation (17×17 Fuel)" MAPI-1043, Mar. 1976, pp. 1-30.

"Fluid Resistance of pipes and Ducts", edited by the Japan Society of Mechanical Engineers, JSM, pp. 1-9.

Hiroya Shida et al., "Numerical Analysis Method of Compressor Internal Flow and Performance", Transactions of the Japan Society of Mechanical Engineers, JSM (B Edition), vol. 48, No. 433, Sep. 1982, pp. 1-20.

* cited by examiner

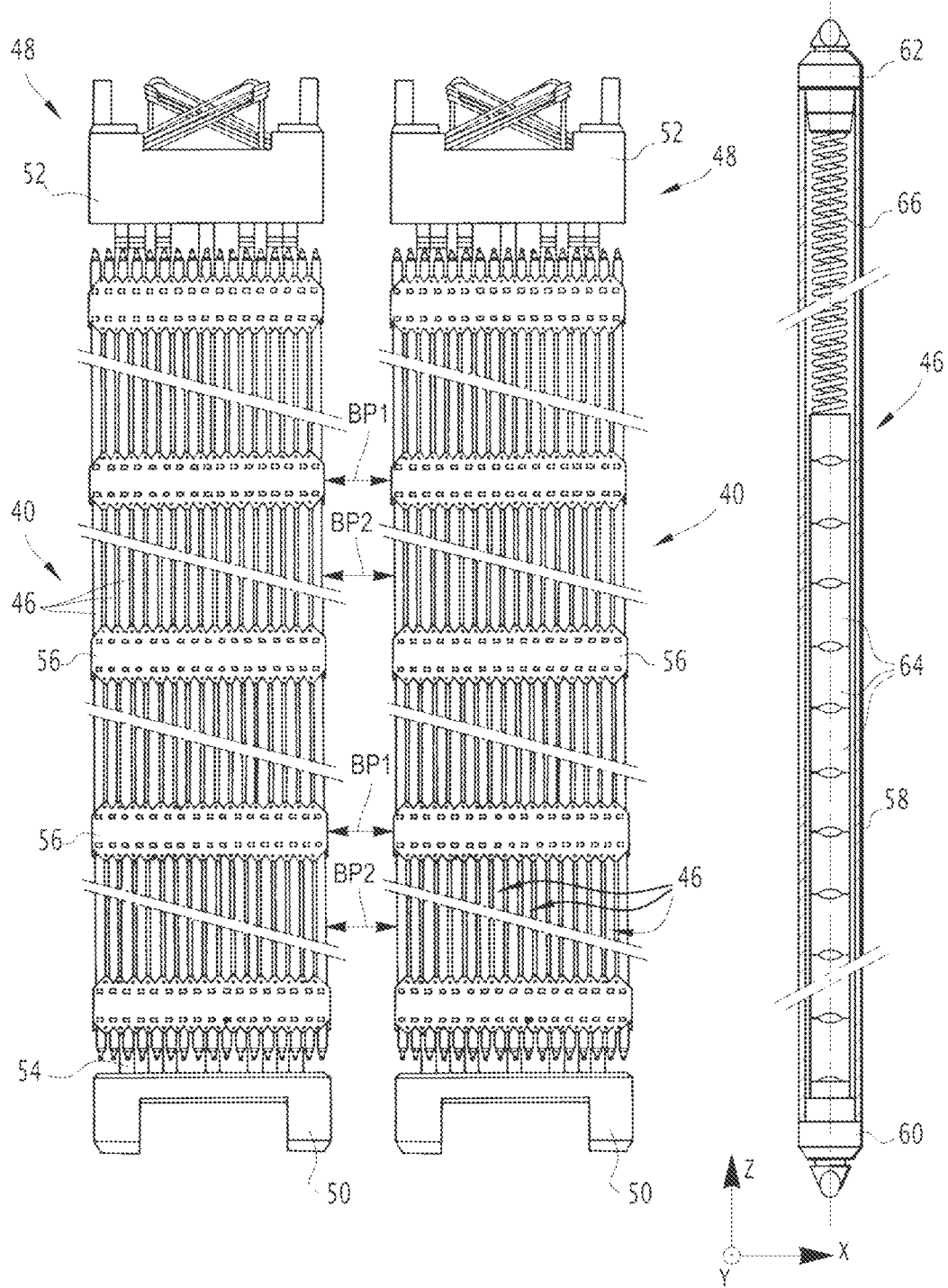

METHODS FOR SIMULATING THE FLOW OF A FLUID IN A VESSEL OF A NUCLEAR REACTOR AND FOR CALCULATING THE MECHANICAL DEFORMATION OF ASSEMBLIES OF A NUCLEAR REACTOR CORE, AND ASSOCIATED COMPUTER PROGRAM PRODUCTS

The present invention relates to a method for simulating the flow of a fluid in a vessel of a nuclear reactor.

The invention also relates to a method for calculating a mechanical deformation of at least one nuclear fuel assembly of a core positioned inside the vessel of the nuclear reactor.

The invention also relates to a computer program product for implementing such a simulation method and a computer program product for implementing such a method for calculating the mechanical deformation.

The invention applies to reactors having a coolant fluid, in particular reactors using a cooling gas or liquid: light water, heavy water, salt or molten metal.

Hereinafter, the invention will be described for an application to light water reactors, for example pressurized water reactors, and the fluid circulating inside the vessel is then pressurized water.

BACKGROUND OF THE INVENTION

Traditionally, the nuclear reactor of a pressurized water reactor comprises a vessel and a core positioned inside the vessel. The core includes nuclear fuel assemblies, each assembly extending in an axial direction, preferably vertically. Each assembly includes nuclear fuel rods and grids designed to maintain the positioning of the rods and/or to ensure mixing of the coolant fluid, and is spaced apart from another assembly by a clearance following a transverse direction perpendicular to the axial direction. The rods each include a sheath containing nuclear fuel pellets.

The fuel, such as pressurized water, flows inside the vessel, for example by rising inside the latter to the core, to be heated therein while ensuring the refrigeration and moderation in the core.

One recurring need is to simulate, by a computer and as precisely as possible, the flow of the fluid inside the vessel, for example to improve the computation of a mechanical deformation of the assemblies of the core during operation of the reactor, while not requiring an excessive computing power. The deformations of the assemblies are in fact likely to disrupt the operation and performance of the reactor: risk of incomplete insertion of control clusters, which make it possible to adjust the reactivity of the core of the nuclear reactor, or unacceptable increase in their drop time, risk of local variation of the moderation of the core, etc. During handling, for example during unloading and reloading operations of the core for maintenance, these deformations increase the risks of catching between the fuel assemblies. A better modeling of these deformations is therefore sought in order to resolve these issues, or at least to define palliative measures.

Document KR 100 957 066 B1 describes a method for modeling a nuclear reactor core implementing a digital mechanical computation of the fluids, also called CFD (Computational Fluid Dynamics). The model of the core is based on a porous model.

Document KR 100 957 061 B1 describes a safety analysis method for a nuclear reactor implementing hydraulic computations from head loss coefficients.

However, the simulation of the flow of the fluid inside the vessel is not optimal, homogenous modeling of the core not making it possible to determine the deformations of the fuel assemblies. Furthermore, this modeling requires an excessive computing power to be able to be implemented with the current computation means.

SUMMARY OF THE INVENTION

One aim of the invention is therefore to provide a method for simulating the flow of the fluid inside the vessel of the reactor offering a better modeling of the flow, in particular to improve the computation of the mechanical deformation of the assemblies of the core, while not requiring an excessive computing power.

To that end, the invention provides a method for simulating the flow of a fluid inside a vessel of a nuclear reactor, the nuclear reactor comprising the vessel and a core positioned inside the vessel, the core including nuclear fuel assemblies, each assembly extending in an axial direction and including nuclear fuel rods and at least one grid for maintaining the rods, each assembly being spaced apart from another assembly by a clearance between the grids in a transverse direction perpendicular to the axial direction, the fluid being able to flow inside the core, the method comprising the following steps:

i) determining head loss coefficients in the core,
ii) computing the pressure of the fluid and the component(s) of the speed of the fluid in the core, using the following equation:

$$\nabla P = -K \times V$$

where $\nabla$ is the order one spatial derivation nabla operator,
P is the component of the pressure of the fluid,
K is a matrix including the head loss coefficients determined during step i), and
V is a vector including the component(s) of the speed of the fluid, in which method, during step i), a transverse head loss coefficient in the assemblies is determined as a function of a transverse Reynolds number in the transverse direction, and an axial head loss coefficient in the clearance is determined as a function of the dimension of the clearance in the transverse direction.

According to other advantageous aspects of the invention, the simulation method comprises one or more of the following features, considered alone or according to all technically possible combinations:

during step i), the transverse head loss coefficient is determined, for a value of the transverse Reynolds number, by comparison with a variable, such as a hydraulic force in the transverse direction, computed for part of the assembly using a first model, with said variable computed for said part of the assembly using a second model, separate from the first model;

the relationship of the transverse head loss coefficient as a function of the transverse Reynolds number is computed by interpolation of several values of the transverse head loss coefficient determined for a plurality of comparisons performed;

at least one grid among the grids further comprises additional mixing elements able to generate a flow having at least one transverse speed in the transverse direction, and at least one second grid among the grids does not include additional mixing elements, and a first relationship of the transverse head loss coefficient as a function of the transverse Reynolds number is computed for a first part of the assembly including the first grid, and a second relationship of the transverse head loss coefficient as a function of the transverse Reynolds number is computed for a second part of the assembly including the second grid;

during step i), the axial head loss coefficient in the clearance is determined, for a value of the dimension of the clearance, by comparison with a variable, such as a hydraulic force in the transverse direction, computed for part of the assembly using a first model, with said variable computed for said part of the assembly using a second model, different from the first model;

the relationship of the axial head loss coefficient in the clearance as a function of dimension of the clearance is computed by interpolation of several values of the axial head loss coefficient in the clearance between the grids, determined for a plurality of comparisons performed;

during step i), the head loss coefficients other than the transverse head loss coefficient in the assemblies and the axial head loss coefficient in the clearance between the grids each have a predetermined value, preferably a predetermined constant value;

the vessel includes a fluid inlet orifice and a fluid outlet orifice, the core includes a lower plate and an upper plate, the assemblies extending between the lower and upper plates, the core having a volume delimited by first and second interfaces in the axial direction, the first and second interfaces respectively corresponding to the lower and upper plates, and the method further comprises the following steps:
determining at least one additional volume inside the vessel, the additional volume being outside the core volume and situated at one end thereof in the axial direction, the additional volume being delimited by two interfaces in the axial direction, one of the two interfaces of the additional volume being the first interface or the second interface, computing, for the additional volume and using the mass balance, movement quantity balance and energy balance equations of the fluid, the pressure of the fluid and the component(s) of the speed of the fluid, from an initial value of the speed or pressure in one of the interfaces of the additional volume and an initial value of the speed or the pressure in the other of the interfaces of the additional volume, computing, for the core volume, the pressure of the fluid and the component(s) of the speed of the fluid, from an initial value of the speed or pressure of the fluid in the first interface and an initial value of the speed or pressure of the fluid in the second interface and according to step ii), and the computation of the pressure of the fluid and of the component(s) of the speed of the fluid is first done for a first volume among the additional volume and the core volume, and in particular in the interface among the first and second interfaces that is shared by the additional volume and the core volume, then the pressure of the fluid and of the component(s) of the speed of the fluid is computed for the second volume among the additional volume and the core volume, the initial value of the speed or pressure at the interface shared by the additional volume and the core volume and for that computation step associated with the second volume then being the value of the corresponding variable among the speed and the pressure previously computed at said interface for the first volume;

the mass balance, movement quantity balance and energy balance equations are respectively as follows:

$$\frac{\partial \rho}{\partial t} + \nabla(\rho V) = S_m$$

$$\frac{\partial (\rho V)}{\partial t} + \nabla \cdot (\rho V \otimes V) = -\nabla P + \nabla \cdot \tau + \rho F + S_i$$

$$\frac{\partial (\rho E)}{\partial t} + \nabla \cdot [(\rho E + P) \times V)] = \nabla \cdot (\tau \cdot V) + \rho F \cdot V - \nabla \cdot Q + R + S_e$$

where $\nabla$ is the order one spatial derivation nabla operator, P is the component of the pressure of the fluid, V is a vector including the component(s) of the speed of the fluid, $\rho$ is the density of the fluid, t is the time, $\tau$ is the tensor of the viscous stresses, F is a vector including the component(s) of the resultant of the mass forces exerted in the fluid, E is a total energy per unit of mass, Q is a vector including the component(s) of the heat lost by thermal conduction, R is the volume heat loss due to radiation, $S_m$ is the mass source, $S_i$ is the movement quantity source, and $S_e$ is the energy source;

the computation step for the first volume is reiterated with, as initial value of the speed or the pressure at that shared interface and for that reiteration of the computation step associated with the first volume, the value of the corresponding variable among the speed and pressure computed during a step carried out previously in that interface for the second volume, and the computation step for the second volume is reiterated with, as initial value of the speed or the pressure in said shared interface and for that reiteration of the computation step associated with the second volume, the value of the corresponding variable among the speed and pressure previously computed in said interface for the first volume during the reiteration;

two additional volumes are determined during the determining step: an additional upstream volume situated upstream from the core volume in the flow direction of the fluid and a downstream additional volume situated downstream from the core volume in the flow direction of the fluid, the first interface of the core volume being shared with the additional upstream volume and the second interface of the core volume being shared with the additional downstream volume, and the computation of the pressure of the fluid and the component(s) of the speed of the fluid is done:

a) in the first interface, first for a first volume among the upstream additional volume and the core volume, and for second volume among the additional upstream volume and the core volume, the initial value of the speed or the pressure in the first interface for the computation step associated with the second volume being the corresponding variable among the speed and pressure previously computed in the first interface during the computation step associated with first volume, and b) in the second interface, first for a third volume among the additional downstream volume and the core volume, then for a fourth volume among the additional downstream volume and the core volume, the initial value of the speed or the pressure in the second interface for the computation step associated with the fourth volume being the corresponding variable among the speed and the pressure previously computed in the second interface during the computation step associated with the third volume.

The invention also provides a computer program product including software instructions which, when executed by a computer, implement a simulation method as defined above.

The invention also a method for calculating a mechanical deformation of at least one assembly of a core of a nuclear reactor, the nuclear reactor comprising a vessel and the core positioned inside the vessel, the mechanical deformation of each assembly depending on the flow of a fluid inside the vessel, in which the flow of the fluid is simulated with a simulation method as defined above.

The invention also provides a computer program product including software instructions which, when executed by a computer, implement a method for calculating the mechanical deformation as defined above.

BRIEF DESCRIPTION OF THE DRAWINGS

These features and advantages of the invention will appear upon reading the following description, provided solely as a non-limiting example, and done in reference to the appended drawings, in which:

FIG. 3 is a diagrammatic view of two assemblies of the core of FIG. 1, the assemblies extending in an axial direction, i.e., the vertical direction, each assembly including nuclear fuel rods and grids for maintaining the rods, the two assemblies being spaced apart from one another, in a transverse direction perpendicular to the axial direction, by a first clearance between the respective grids of the two assemblies and by a second clearance between the respective rods of the two assemblies, FIG. 4 is a diagrammatic view of a rod of FIG. 3.

DETAILED DESCRIPTION OF PREFERRED EMBODIMENTS

Figure 1:
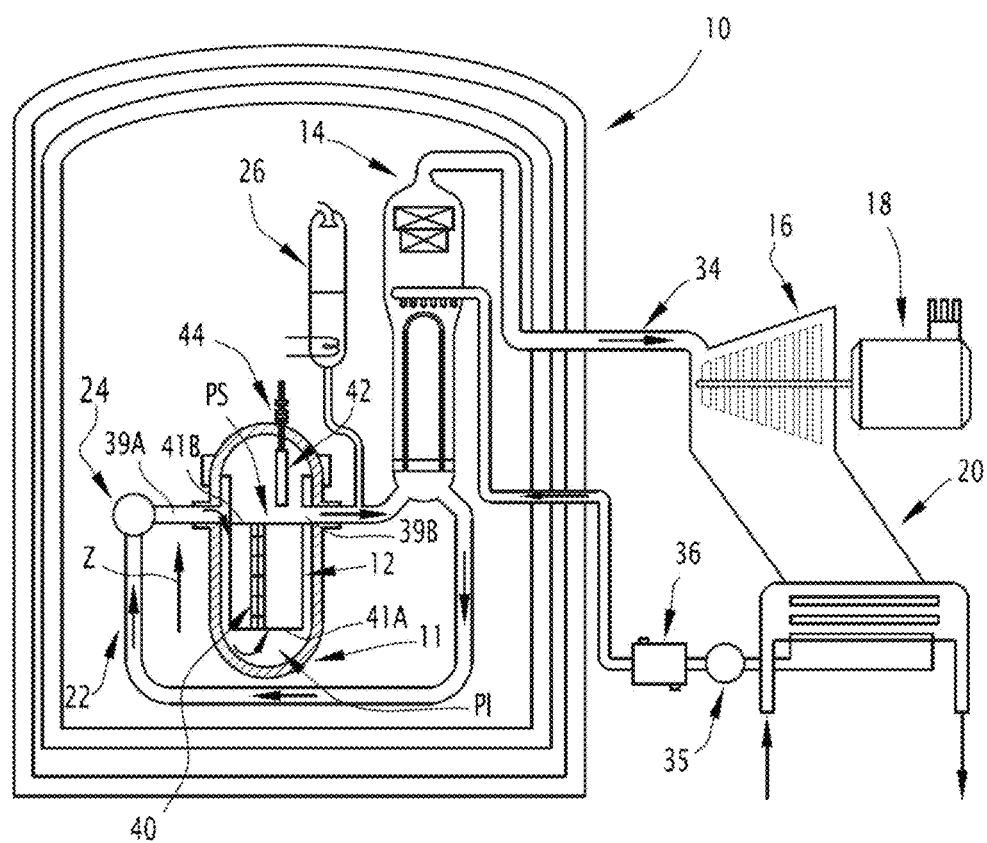
FIG. 1 is a diagrammatic illustration of a pressurized water nuclear reactor, including a vessel and a core positioned inside the vessel, the core including nuclear fuel assemblies.

In FIG. 1, a nuclear reactor 10 comprises, as is known per se, a vessel 11 and a core 12 positioned inside the vessel 11.

The nuclear reactor 10 also comprises one or more steam generators 14, one or more turbines 16 each coupled to an electricity generator 18, and one or more condensers 20, only one of each of these elements being shown in FIG. 1.

The nuclear reactor 10 further comprises a primary circuit 22 equipped with pumps 24 and in which a fluid flows, along the path embodied by the arrows in FIG. 1. This fluid in particular rises inside the vessel 11 through the core 12 to be heated therein while ensuring refrigeration and moderation in the core 12. The primary circuit 22 further comprises a pressurizer 26 making it possible to regulate the pressure of the fluid flowing in the primary circuit 22.

The nuclear reactor 10 is, for example, a pressurized water reactor (PWR), and the fluid flowing in the primary circuit 22 is then pressurized water.

Alternatively, the nuclear reactor 10 is a boiling water reactor (BWR), and the fluid flowing in the primary circuit is then pressurized water, in the form of steam in the upper part of the core, the pressure generally being lower than that of the water flowing in the primary circuit of the pressurized water reactor. Alternatively, the nuclear reactor 10 is a reactor cooled with sodium, molten salts or gas.

The nuclear reactor 10 comprises a secondary circuit 34 connected to the steam generator 14. The water of the primary circuit 22 supplies the steam generator 14, where it is cooled by ensuring vaporization of water, the steam produced by the steam generator 14 being channeled by the secondary circuit 34 for the turbine 16, then for the capacitor 20, where that steam is condensed by indirect heat exchange with the cooling water flowing in the condenser 20. The secondary circuit 34 comprises, downstream from the condenser 20, a pump 35 and a heater 36.

Figure 2:
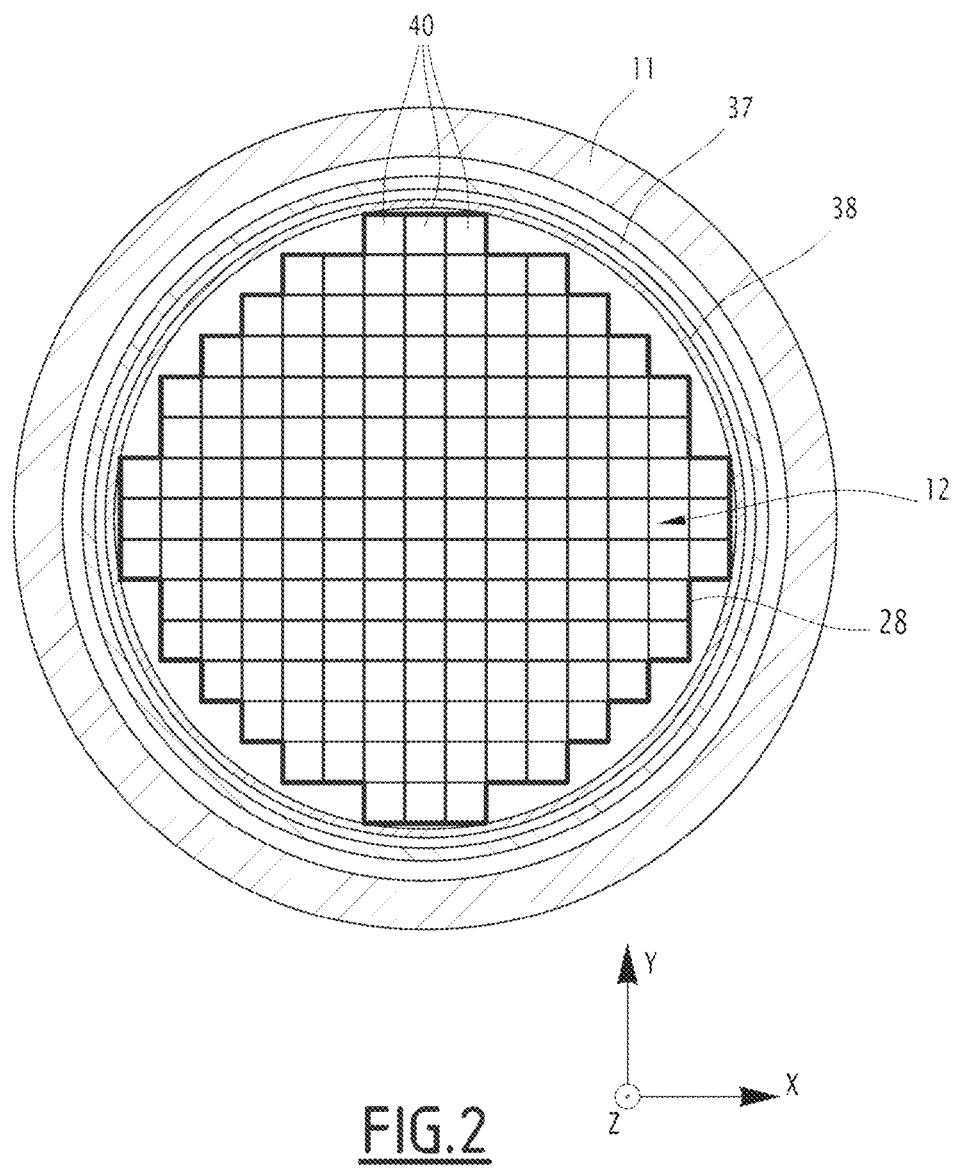
FIG. 2 is a horizontal sectional view, at the core, of the reactor of FIG. 1.

The nuclear reactor 10 comprises a heat shield 37, an enclosure of the core 38 and a reflector 28, shown in FIG. 2 and positioned inside the vessel 11.

The vessel 11 includes an inlet orifice 39A for the fluid and an outlet orifice 39B for the fluid, the inlet and outlet orifices 39A, 39B being connected to the primary circuit 22.

Also traditionally, the core 12 comprises nuclear fuel assemblies 40 that are loaded in the vessel 11 and extend in an axial direction, such as the vertical direction Z.

The core 12 typically comprises more than one hundred assemblies 40. In the example of a 900 MWe reactor illustrated in FIG. 2, the core 12 comprises 157 assemblies 40.

FIG. 2 shows a top view of an example of the distribution of these different assemblies 40 within the core 12. Each square in that figure embodies an assembly 40.

The core 12 also comprises, as is known per se, a lower plate 41A and an upper plate 41B positioned on either side of the assemblies 40 in the axial direction when the reactor 10 is operating, the assemblies 40 being deposited on the lower plate 41A and the upper plate 41B being positioned above the assemblies 40, in contact with their upper end, as shown in FIG. 1. The core 12 has a volume $Vol_C$ delimited in the axial direction by first and second interfaces, the first and second interfaces respectively corresponding to the lower and upper plates 41A, 41B, and in the lateral direction by the reflector 28.

The vessel 11 includes two additional volumes outside the core volume $Vol_C$ and situated on either side thereof in the axial direction Z, i.e., an additional upstream volume $Vol_{PI}$ situated upstream from the core volume $Vol_C$ in the flow direction of the fluid, in the described example corresponding to a zone P1 situated below the core 12 in the axial direction Z, zone also being called lower plenum, and an additional downstream volume $Vol_{PS}$ situated downstream from the core volume $Vol_C$ in the flow direction of the fluid, in the described example corresponding to a zone PS situated above the core 12 in the axial direction Z, zone also being called upper plenum, as shown in FIG. 1. Each additional volume $Vol_{PI}$, $Vol_{PS}$ is delimited by two interfaces in the axial direction Z, one of the two interfaces of the additional volume $Vol_{PI}$, $Vol_{PS}$ being the first interface or the second interface. In the described example, the shared interface between the additional upstream volume $Vol_{PI}$ and the core volume $Vol_C$ is the first interface, and the shared interface between the core volume $Vol_C$ and the additional downstream volume $Vol_{PS}$ is the second interface.

The core volume $Vol_C$ includes the first interface with the additional upstream volume $Vol_{PI}$ and the second interface with the additional downstream volume $Vol_{PS}$. The additional upstream volume $Vol_{PI}$ is crossed through by the fluid flowing from the inlet orifice 39A toward the core 12, and the additional downstream volume $Vol_{PS}$ is crossed through by the fluid flowing from the core 12 toward the outlet orifice 39B.

Each interface of the core volume $Vol_C$ and the additional upstream and downstream volumes $Vol_{PI}$, $Vol_{PS}$ is also called a border, given that each interface forms a border with the outside for the volume in the considered direction. Each interface is for example in the form of a surface perpendicular to the axial direction Z.

In the example described above, the core volume $Vol_C$ and the additional upstream and downstream volumes $Vol_{PI}$, $Vol_{PS}$ are each in the form of a cylinder with a generating line parallel to the axial direction Z. Each interface of the core volume $Vol_C$ is for example in the form of a planar disc in a plane perpendicular to the axial direction Z.

The core 12 comprises control clusters 42, shown in FIG. 1, that are positioned in the vessel 11 above certain assemblies 40. A single cluster 42 is shown in FIG. 1. The clusters 42 are movable by mechanisms 44 to be inserted into the assemblies 40 that they overhang, or to be removed therefrom. Traditionally, each control cluster 42 comprises absorbent rods that include one or more materials absorbing neutrons, and optionally inert rods, i.e., rods that have no specific absorption capacity with respect to neutrons. The vertical movement of the clusters 42 makes it possible to adjust the reactivity in the core 12 and allows variations of the overall power P supplied by the core 12 from the zero power to the nominal power PN, as a function of the pushing of the control clusters 42 into the assemblies 40.

As illustrated by FIG. 3, each assembly 40 traditionally comprises an array of nuclear fuel rods 46 and a support skeleton 48 for the rods 46. The skeleton 48 traditionally comprises a lower end-piece 50, an upper end-piece 52, guide-tubes 54 connecting the two end-pieces 50, 52 and designed to receive the rods of the control clusters of the reactor 10, and grids 56 for maintaining the rods 46.

Figure 5:
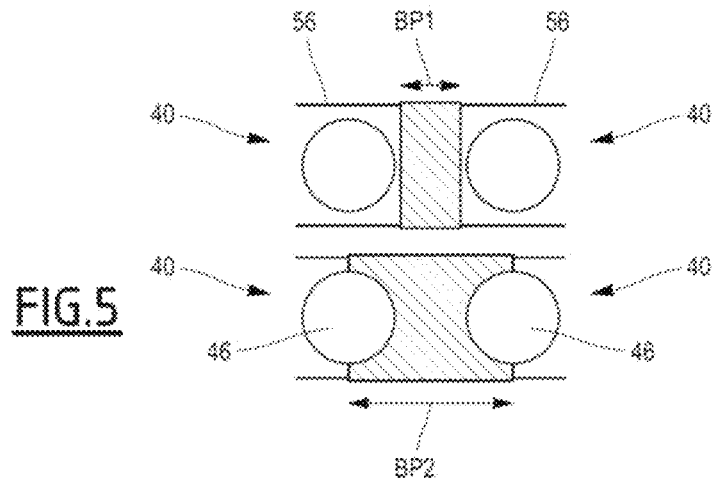
FIG. 5 is a diagrammatic top view of the first and second clearances of FIG. 3.

FIG. 3 shows two adjacent assemblies 40, i.e., two assemblies 40 corresponding to adjacent squares in a transverse direction X or Y, perpendicular to the axial direction Z, in the illustration of FIG. 2. The two adjacent assemblies 40 are positioned successively and spaced apart from one another, in a transverse direction, by a first clearance BP1 between the respective grids 56 of the two assemblies 40 and by a second clearance BP2 between the respective rods 46 of the two assemblies 40, as shown in FIGS. 3 and 5.

In FIG. 2, the assemblies 40 are substantially aligned in two respective directions X, Y in the horizontal plane perpendicular to the vertical direction Z, and one skilled in the art will understand that when the two successive assemblies 40 are aligned in the direction X, then the transverse direction associated with the first and second clearances BP1, BP2 corresponds to that direction X. Similarly, when the two successive assemblies 40 are aligned in the direction Y, then the transverse direction associated with the first and second clearances BP1, BP2 corresponds to that direction Y.

The dimension of the first clearance BP1 is equal to the distance between the outer faces of the perspective grids 56 of the two assemblies 40 in the transverse direction, for a given position in the axial direction Z. By convention, the dimension of the second clearance BP2 is equal to the distance between the centers of the two respective peripheral rods 46 of the two assemblies, for a given position in the axial direction Z, as shown in FIG. 5.

As illustrated by FIG. 4, each rod 46 traditionally comprises a sheath 58 in the form of a tube closed at its lower end by a lower stopper 60 and at its upper end by an upper stopper 62. The rod 46 comprises a series of nuclear fuel pellets 64 stacked in the sheath 58 and bearing against the lower stopper 60. A maintaining spring 66 is positioned in the upper segment of the sheath 58 to bear on the upper stopper 62 and on the upper pellets 64.

Traditionally, the pellets 64 have a base of uranium oxide or a mixture of uranium and plutonium oxides, and the sheath 58 is made from zirconium alloy.

Figure 6:
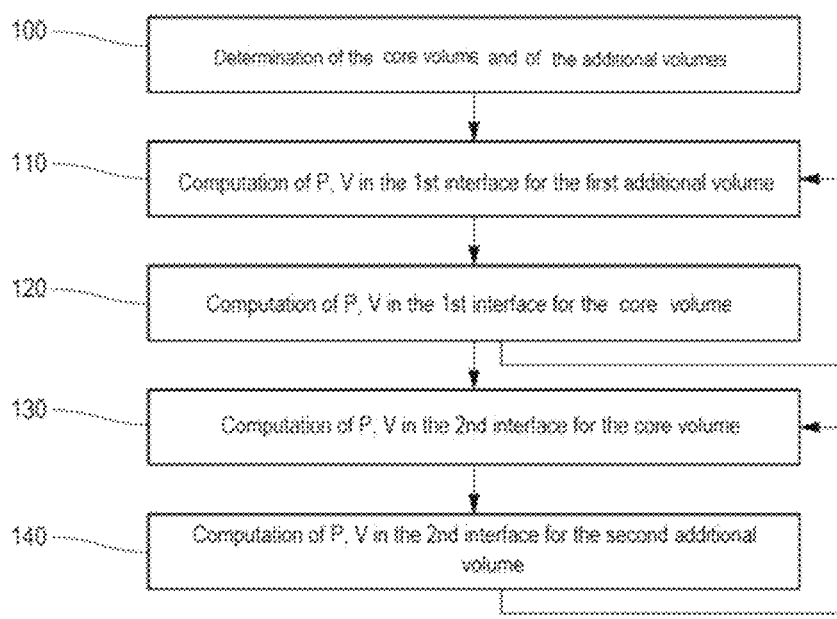
FIG. 6 is a flowchart of the simulation method according to a first aspect of the invention.

A method for simulating the flow of the fluid inside the vessel 11 of the nuclear reactor 10 according to a first aspect of the invention will now be described using the flowchart of FIG. 6.

The simulation method according to the first aspect is designed to be implemented by a computer including a processor and a memory associated with the processor, the memory being able to store a first computer program product. The first computer program product includes software instructions and implements the simulation method according to the first aspect when said software instructions are executed by the computer.

During the initial step 100, the core volume $Vol_C$ delimited in the axial direction Z by the lower and upper plates 41A, 41B, corresponding to the first and second interfaces, is determined. At least one additional volume $Vol_{PI}$, $Vol_{PS}$ is also determined inside the vessel 11, the additional volume $Vol_{PI}$, $Vol_{PS}$ being outside the core volume $Vol_C$ and situated at one end thereof in the axial direction Z. The additional volume $Vol_{PI}$, $Vol_{PS}$ is delimited by two interfaces in the axial direction Z, one of the two interfaces of the additional volume $Vol_{PI}$, $Vol_{PS}$ being the first interface or the second interface. In other words, the core volume $Vol_C$ includes an interface with the additional volume $Vol_{PI}$, $Vol_{PS}$, the additional volume $Vol_{PI}$, $Vol_{PS}$ being crossed through by the fluid flowing between the core 12 and an orifice among the inlet orifice 39A and the outlet orifice 39B. In the described example, two additional volumes are determined during this initial step, i.e., the upstream and downstream additional volumes $Vol_{PI}$, $Vol_{PS}$.

During the following step 110, the component(s) of the speed V and the pressure P of the fluid are computed for the upstream additional volume $Vol_{PI}$, from an initial value of the speed V or the pressure P in one of the interfaces of the additional volume $Vol_{PI}$, $Vol_{PS}$ and an initial volume of the speed V or the pressure P in another of the interfaces of the additional volume $Vol_{PI}$, $Vol_{PS}$. The component(s) of the speed and pressure are computed from balance equations, used in fluid mechanics, i.e., from:

the balance equation of the mass of the fluid, or continuity equation, the balance equation of the movement quantity of the fluid, and the balance equation of the energy of the fluid.

These initial values are also called initial conditions, and are predetermined at the beginning of each computation step for the pressure and the component(s) of the speed associated with the considered volume among the core volume $Vol_C$ and the additional upstream and downstream volumes $Vol_{PI}$, $Vol_{PS}$. In the described example, the predetermined initial values are the components of the speed V at the input of said volume $Vol_{PI}$, $Vol_{PS}$ and the component, also called value, of the pressure P of the fluid at the outlet of said volume $Vol_{PI}$, $Vol_{PS}$.

Alternatively, the predetermined initial values are the value of the pressure P of the fluid at the inlet of said volume and the components of the speed V at the outlet of said volume.

Also alternatively, the predetermined initial values are the components of the speed V at the inlet of said volume and the components of speed V at the outlet of said volume.

In the described example, the components of the speed at the inlet of the additional upstream volume $Vol_{PI}$ and the pressure P at the outlet of the additional downstream volume $Vol_{PS}$ are conditions with limits imposed by the reactor: the inlet speed of the additional upstream volume $Vol_{PI}$ is determined by the flow rate of the pumps 24, and the pressure P at the outlet of the additional downstream volume $Vol_{PS}$ is that measured at the inlet of the steam generator 14. These two values are fixed throughout the entire computation.

The balance equations assume different forms depending on the selected approximations and differential operators used. For example, the general differential formulation of these equations (Navier-Stokes equations) is respectively written as follows:

mass balance of the fluid:

$$\frac{\partial \rho}{\partial t} + \nabla(\rho V) = S_m \qquad (1)$$

movement quantity balance of the fluid:

$$\frac{\partial (\rho V)}{\partial t} + \nabla \cdot (\rho V \otimes V) = -\nabla P + \nabla \cdot \tau + \rho F + S_i \qquad (2)$$

energy balance of the fluid:

$$\frac{\partial (\rho E)}{\partial t} + \nabla \cdot [(\rho E + P) \times V)] = \nabla \cdot (\tau \cdot V) + \rho F \cdot V - \nabla \cdot Q + R + S_e \qquad (3)$$

where $\nabla$ is the order one spatial derivation nabla operator,
P is the pressure of the fluid,
V is a vector including the component(s) of the speed of the fluid,
$\rho$ is the density of the fluid,
t is the time, $\tau$ is the tensor of the viscous stresses,
F is a vector including the component(s) of the resultant of the mass forces exerted in the fluid,
E is a total energy per unit of mass,
Q is a vector including the component(s) of the heat flow lost by thermal conduction,
R is the volume heat loss due to the radiation,
$S_m$ is the mass source,
$S_i$ is the movement quantity source, and
$S_e$ is the energy source.

In orthonormal Cartesian coordinates, these equations are for example written as follows for a computation without taking thermal effects into account (pure hydraulics):

mass conservation equation:

$$\frac{\partial \rho}{\partial t} + \sum_{i=1}^{3} \frac{\partial}{\partial x_i}(\rho v_i) = S_m \qquad (4)$$

movement quantity conservation equation (for j=1, 2, 3):

$$\frac{\partial (\rho v_j)}{\partial t} + \sum_{i=1}^{3} \frac{\partial}{\partial x_i}(\rho v_i v_j - \tau_{ij}) = -\frac{\partial P}{\partial x_i} + S_m \qquad (5)$$

where t is the time,
$\rho$ is the density of the fluid,
$x_i$ is the coordinate in direction i (i=1, 2, 3),
$v_i$ is the speed of the fluid in direction i
P is the pressure of the fluid,
$S_m$ is the mass source,
$S_i$ is the movement quantity source
$\tau_{ij}$ is the viscous stress, with $$\tau_{ij} = 2\mu s_{ij} - \frac{2}{3}\mu \frac{\partial u_k}{\partial x_k}\delta_{ij} \qquad (6)$$

where $\mu$ designates the dynamic viscosity of the fluid and $\delta_{ij}$ the Kronecker delta.

Added to these equations are the closing equations, which provide characteristics of the fluid: density, viscosity, specific heat, conductivity and compressibility at all points of the studied volume.

The computation model associated with the aforementioned mass balance, movement quantity balance and energy balance equations is also called detailed model.

Alternatively, the component(s) of the speed V and the pressure P of the fluid are computed for example assuming that the fluid is Newtonian and incompressible: $\rho$ and $\mu$ are then constant.

Furthermore, the hydraulic transitions in the nuclear reactors in normal operation being relatively slow, they may be neglected and the hydraulic computations are then done as a series of periodic permanent states, in which case the Navier Stokes equations are written:

$$\nabla(\rho V) = S_m \qquad (7)$$

$$\rho(V \cdot \nabla)V = -\nabla P + \mu\left[\nabla^2 V + \frac{1}{3}\nabla(\nabla \cdot V)\right] + \rho F + S_e \qquad (8)$$

where $\mu$ designates the dynamic viscosity of the fluid, which is assumed to be constant.

The computation model associated with the Navier Stokes equation is also called semi-detailed model, because the Navier-Stokes equation is obtained from the aforementioned mass balance, movement quantity balance and energy balance equations using the aforementioned hypotheses verified by the Newtonian fluids.

During step 110, the component(s) of the speed V and the pressure P of the fluid are computed over the entire additional upstream volume $Vol_{PI}$, and in particular for the first interface in order to perform a computation coupling with the component(s) of the speed V and the pressure P of the fluid, which will be computed for the core volume $Vol_C$ during the following step 120.

The fluid flowing from the additional upstream volume $Vol_{PI}$ toward the core volume $Vol_C$, the computation done for the additional upstream volume $Vol_{PI}$ in particular makes it possible to predetermine the component(s) of a variable among the speed V and the pressure P of the fluid at the outlet of said additional volume $Vol_{PI}$, i.e., in the first interface, which also corresponds to the inlet of the core volume $Vol_C$.

In the described example, one therefore in particular computes the component(s) of the speed V of the fluid at the outlet of the additional upstream volume $Vol_{PI}$, i.e., the volume of the lower plenum, from the speed of the fluid at the inlet of the additional upstream volume $Vol_{PI}$ and by imposing a predetermined value of the pressure P of the outlet fluid. In other words, a distribution of the flow rate of the fluid is computed at the outlet of the additional upstream volume $Vol_{PI}$ by imposing a distribution of the pressure P of the fluid at the outlet of said additional upstream volume $Vol_{PI}$.

During step 110, the composition of the pressure P of the fluid and the component(s) of the speed V is preferably done using a semi-detailed model, i.e., using Navier-Stokes equations (7) and (8). This semi-detailed model in fact provides a very good model of the flow of the fluid while requiring a lower computing power than the detailed model.

The component(s) of the speed V and the pressure P of the fluid are then computed during step 120, for the entire core volume $Vol_C$, from the component(s) of a variable among the speed V and the pressure P of the predetermined fluid at the outlet of said volume, the other variable among the speed V and the pressure P of the predetermined fluid at the inlet of said volume then being the variable previously computed in step 110 for the volume situated upstream, i.e., for the additional upstream volume $Vol_{PI}$. In other words, the component(s) of the speed V and the pressure P of the fluid are then computed during step 120, for the entire core volume $Vol_C$ from an initial value of the speed V or the pressure P of the fluid in the first interface and an initial value of the speed V or the pressure P of the fluid in the second interface.

In the described example, one therefore in particular computes the pressure P of the fluid in the entire core volume $Vol_C$, and therefore in particular at the inlet of the core volume $Vol_C$, i.e., in the first interface, which also corresponds to the outlet of the additional upstream volume $Vol_{PI}$, using the values of the component(s) of the speed V of the fluid computed during the previous step in that same first interface. In other words, in this example, a distribution of the pressure P of the fluid at the inlet of the core volume is computed from the distribution of the flow rate of the fluid previously computed at the outlet of the volume of the lower plenum.

In the described example, the known values are the components of the speed V at the inlet of said volume $Vol_C$, computed during step 110, and the value of the pressure P of the fluid at the outlet of said volume $Vol_C$.

During step 120, for the core volume $Vol_C$, the computation of the pressure P and of the component(s) of the speed V of the fluid are, for example, done using the semi-detailed model. Alternatively, the computation of the pressure P and the component(s) of the speed V of the fluid are done using a particular porous model that will be described in more detail below using the flowchart of FIG. 9.

At the end of step 120, the method returns to step 110, in order to reiterate the computations in the first interface, or the method goes on to step 130 in order to perform the computations in the second interface.

When the method returns to step 110, the computations of the additional upstream volume $Vol_{PI}$ are coupled, in the first interface, to the computations done for the core volume $Vol_C$: the computation step 110 for the volume situated upstream in the flow direction of the fluid, i.e., for the additional upstream volume $Vol_{PI}$, is reiterated with, as value of the other variable, for example the pressure P of the fluid at the outlet of said volume $Vol_{PI}$, the value computed during step 120 previously carried out for the volume situated downstream, i.e., for the core volume $Vol_C$. After reiterating step 110, the method goes on to step 120 in order to reiterate the computation step for the core volume $Vol_C$ situated downstream, using as the value of the other variable, for example, of the component(s) of the speed V at the inlet of said volume $Vol_C$, the new value computed for the additional upstream volume $Vol_{PI}$ situated upstream.

In other words, the computation step 110 for the additional upstream volume $Vol_{PI}$ is reiterated with, as the initial value of the speed V or the pressure P in the shared interface with the core volume $Vol_C$ and for that reiteration of the computation step 110 associated with the additional upstream volume $Vol_{PI}$, the value of the corresponding variable among the speed V and the pressure P computed during the step 120 previously done in said shared interface for the core volume $Vol_C$.

The computation step 120 for the core volume $Vol_C$ is reiterated with, as initial value of the speed V or the pressure P in said shared interface with the additional upstream volume $Vol_{PI}$ and for that reiteration of the computation step 120 associated with the core volume $Vol_C$, the value of the corresponding variable among the speed V and the pressure P previously computed in said interface for the additional upstream volume $Vol_{PI}$ during the reiteration of the computation step 110.

The reiteration of steps 110 and 120 is carried out until obtaining a converged solution in the first interface, i.e., until the ratio of the previous value of a variable divided by the new value of that variable is less than predetermined value, for example $10^{-5}$. One skilled in the art would probably choose to apply the convergence criterion to the variable converging the least quickly.

In the particular case of the application of the invention to the computation of the lateral deformation of fuel assemblies 40, a hydraulic lateral force in the transverse direction X, Y is, for example, computed for each assembly 40, from the pressure P and the component(s) of the speed the computed during step 120 for the core volume $Vol_C$. The hydraulic lateral force is computed upon each iteration of step 120, and the computation of the pressure P and the component(s) of the speed V is stopped when the ratio of the previous value of the lateral hydraulic force divided by the new value of the lateral hydraulic force is below a predefined value, for example $10^{-5}$.

One skilled in the art will observe that it is preferable to define a stop criterion based on the values of the lateral hydraulic force, given that the speed V or the pressure P converge more quickly than the lateral hydraulic force.

During step 130, the component(s) of the speed V and the pressure P of the fluid are computed, for the core volume $Vol_C$, and in particular in the second interface, from the component(s) of a variable among the speed V and the pressure P of the fluid predetermined at the inlet of said volume and the other variable among the speed V and the pressure P of the fluid predetermined at the outlet of said volume.

During step 130, similarly to step 120, for the core volume $Vol_C$, the computations of the component(s) of the speed V and the pressure P of the fluid are, for example, done using the semi-detailed model. Alternatively, the computations of the component(s) of the speed V and the pressure P of the fluid are done using the particular porous model.

In the described example, the component(s) of the speed V and the pressure P of the fluid are computed during step 130 by imposing a predetermined initial value of the speed component(s) at the inlet and a predetermined initial value of the pressure P of the fluid at the outlet. One therefore in particular computes the component(s) of the speed V of the fluid at the outlet of the core volume $Vol_C$, from the speed of the fluid at the inlet of the core volume $Vol_C$ and by imposing a predetermined initial value of the pressure P of the fluid at the outlet. In other words, a distribution of the flow rate of the fluid at the outlet of the core volume $Vol_C$ is computed by imposing a distribution of the pressure P of the fluid at the outlet of said core volume $Vol_C$.

During step 140, the component(s) of the speed V and the pressure P of the fluid are computed over the entire additional downstream volume $Vol_{PS}$, and in particular for the second interface, in order to perform a computation coupling with the component(s) of the speed V and the pressure P of the fluid that were computed previously during step 130 for the core volume $Vol_C$.

The component(s) of the speed V and the pressure P of the fluid are computed during step 140, the additional downstream volume $Vol_{PS}$, from the component(s) of a variable among the speed V and the pressure P of the predetermined fluid at the outlet of said volume, the other variable among the speed V and the pressure of the fluid predetermined at the inlet of said volume being the variable previously computed during step 130 for the volume situated upstream, i.e., for the core volume $Vol_C$. In other words, the pressure P of the fluid and the component(s) of the speed V of the fluid are computed during step 140, for the additional downstream volume $Vol_{PS}$ from an initial value of the speed V or the pressure P in one of the interfaces of the additional downstream volume $Vol_{PS}$ and an initial value of the speed V or the pressure P in the other interfaces of the additional downstream volume $Vol_{PS}$.

In the described example, the pressure P of the fluid is computed during step 140 in particular using the values of the component(s) of the speed V of the fluid computed during the previous step 130 in the same second interface. In other words, in this example, a distribution is computed of the pressure P of the fluid at the inlet of the additional downstream volume $Vol_{PS}$ from the distribution of the flow rate of the fluid computed previously at the outlet of the core volume $Vol_C$.

During step 140, for the additional downstream volume $Vol_{PS}$, the computations of the pressure P and the component(s) of the speed V of the fluid are, for example, done using a semi-detailed model. Alternatively, the computations of the pressure P and the component(s) of the speed V of the fluid are done using the detailed model.

At the end of step 140, the procedure returns to step 130, in order to reiterate the computations in the second interface, or the method returns to step 110 in order to reiterate the computations in the first interface, or stops if a converged solution has been obtained.

Similarly to what was described for the first interface, when the method returns to step 130, the computations of the additional downstream volume $Vol_{PS}$ are coupled, in the second interface, with the computations done for the core volume $Vol_C$: the computation step 130 for the volume situated downstream in the flow direction of the fluid, i.e., for the core volume $Vol_C$, is reiterated with, as value of the other variable, for example the pressure P of the fluid at the outlet of said volume $Vol_C$, the value computed during step 140 previously done for the volume situated downstream, i.e., the additional downstream volume $Vol_{PS}$. After reiterating step 130, the method once again goes on to step 140 in order to reiterate the computation step for the additional downstream volume $Vol_{PS}$ situated downstream, using as the value of the other variable, for example the component(s) of the speed V at the inlet of said volume $Vol_{PS}$, the value previously computed for the core volume $Vol_C$ situated upstream.

The reiteration of steps 130 and 140 is done until a converged solution is obtained in the second interface, i.e., until the ratio of the previous value of a variable divided by the new value of that variable is less than a predetermined value, for example $10^{-5}$. Similarly, one skilled in the art will preferably choose to apply the convergence criterion to the variable converging the least quickly. In the particular case of the application of the invention to the computation of the lateral deformation of the fuel assemblies 40, a lateral hydraulic force in the transverse direction X, Y is for example computed for each assembly 40, from the pressure P and the component(s) of the speed V computed during step 130, for the core volume $Vol_C$. The lateral hydraulic force is computed upon each iteration of step 130 and the computation of the pressure P and the component(s) of the speed V is determined when the ratio of the previous value of the lateral hydraulic force divided by the new value of the lateral hydraulic force is below a predefined value, such as $10^{-5}$.

The described method follows the flow direction of the fluid and propagates the speed V of the fluid imposed by the flow rate of the pumps 24 through the vessel 11 to obtain, at the outlet, the pressure P of the primary circuit measured at the inlet of the steam generator 14.

Alternatively, the method is reversed and follows the direction opposite the flow of the fluid and propagates, through the vessel 11, the pressure P of the primary circuit measured at the inlet of steam generator 14 to obtain the speed V of the fluid imposed by the flow rate of the pumps 24.

Also alternatively, the method advantageously combines the two methods as described below.

One skilled in the art will note that steps 120 and 130 correspond to a same step for computing the pressure P and the component(s) of the speed V of the fluid in the core volume $Vol_C$.

Alternatively and preferably, the computation steps are advantageously carried out in the following order:

step 100 for computing the volumes;

step 110 by using, as initial values, as inlet speed, the speed corresponding to the flow rate delivered by the pumps 24 (condition with invariable limits all throughout the computation) and, as outlet pressure, any initial pressure that will be converged during the steps;

step 140 by using, as initial values, as outlet pressure, the pressure of the primary 22 measured at the inlet of the steam generator 14 (condition with invariable limits all throughout the computation), and as inlet speed, any initial speed that will be converged during the steps;

step 120, 130 for computing the core volume, using as initial values, as inlet speed, the speed computed at the first interface in step 110, and as outlet pressure, the pressure computed at the second interface in step 140; and reiterating steps 110, 140 and 120, 130 until convergence of the computation. Steps 110 and 140 from the first iteration are carried out by injecting the pressure computed during the preceding computation step 120, 130 for the core volume at the outlet of the additional upstream volume $Vol_{PI}$, and the speed computed during the previous computation step 120, 130 for the core volume at the inlet of the additional downstream volume $Vol_{PS}$.

The steps 110 and 140 can be carried out at the same time.

For coupling in the shared interface, the computation models used for the volume situated downstream and for the volume situated upstream in the flow direction of the fluid are preferably separate, the models used for example being the semi-detailed model for the corresponding additional volume $Vol_{PI}$, $Vol_{PS}$ and the particular porous model for the core volume $Vol_C$. Alternatively, the computation models used for the volume situated downstream and for that situated upstream are identical, i.e., for example the semi-detailed model.

Figure 7:
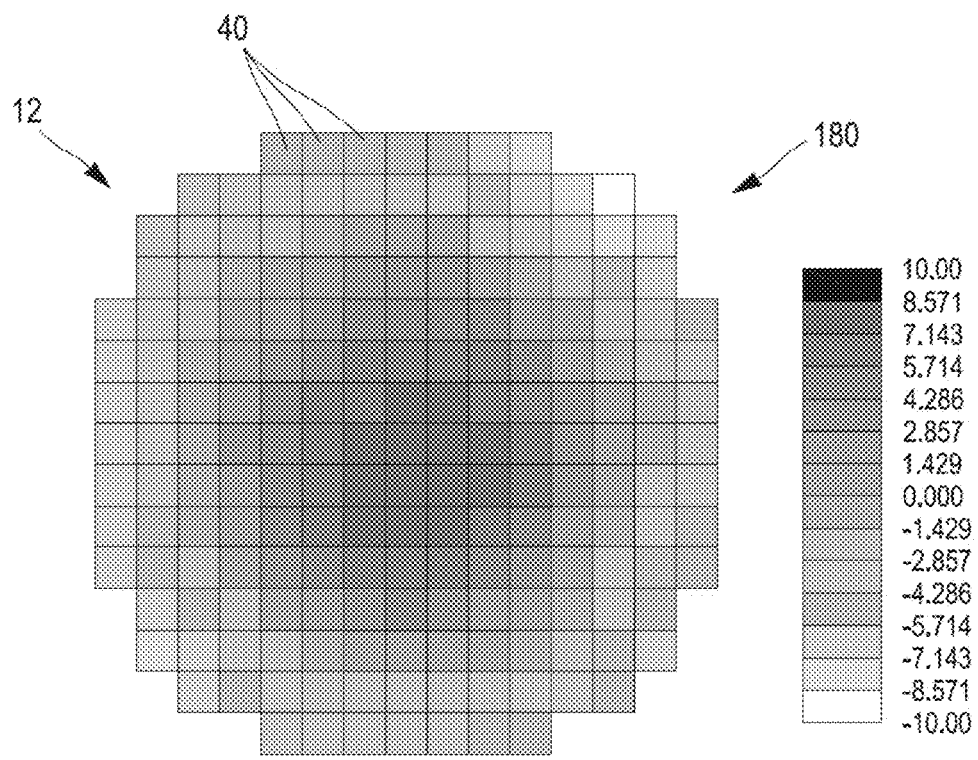
FIG. 7 is a view of the flow rate of the fluid at the inlet of the core computed using a simulation method of the state of the art.
Figure 8:
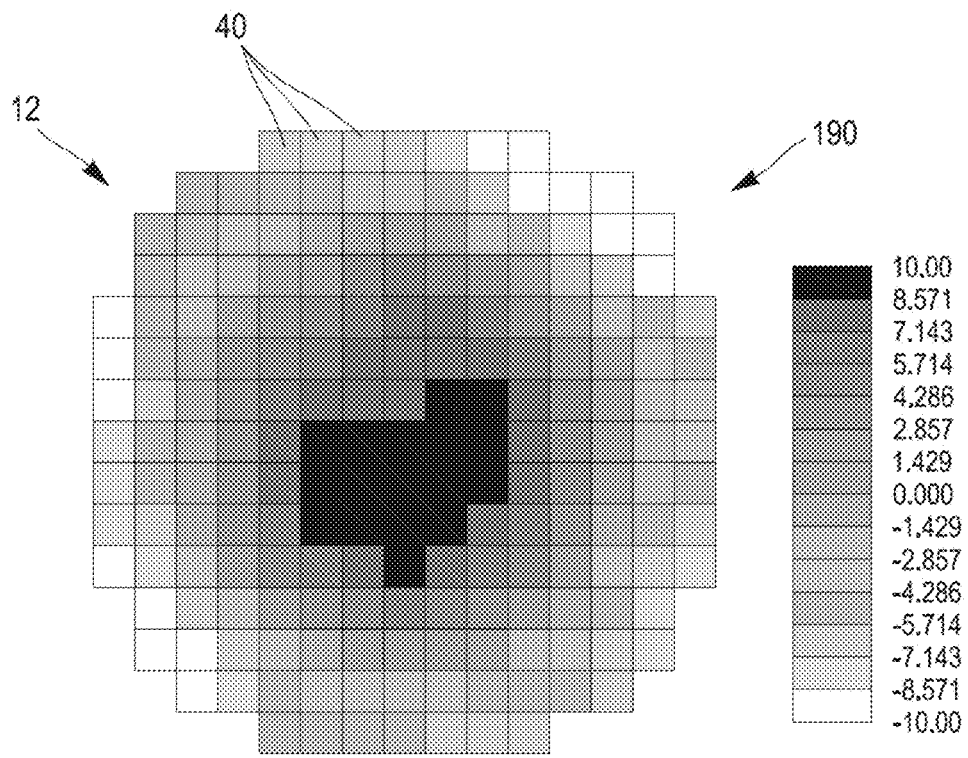
FIG. 8 is a view similar to that of FIG. 7, obtained using the simulation method according to the first aspect of the invention.

The simulation method according to the first aspect of the invention makes it possible to offer better modeling of the flow, as shown by the comparison of FIGS. 7 and 8, showing a view 180 of the flow rate of the fluid at the inlet of the core computed using a simulation method of the state of the art, and a view 190 of the flow rate of the fluid inlet of the core computed using the simulation method according to the first aspect of the invention, respectively. In the views 180 and 190, different values of the flow rate at different assemblies 40 at the inlet of the core are shown in percentage of variation relative to a nominal value of that flow rate. The view 190 then shows greater discrimination between the values of the flow rate computed according to the relevant assembly 40.

The modelization obtained with the simulation method according to the first aspect of the invention (FIG. 8) is therefore more precise than that obtained with the simulation method of the state of the art (FIG. 7), in which the additional volumes are not modeled.

Figure 9:
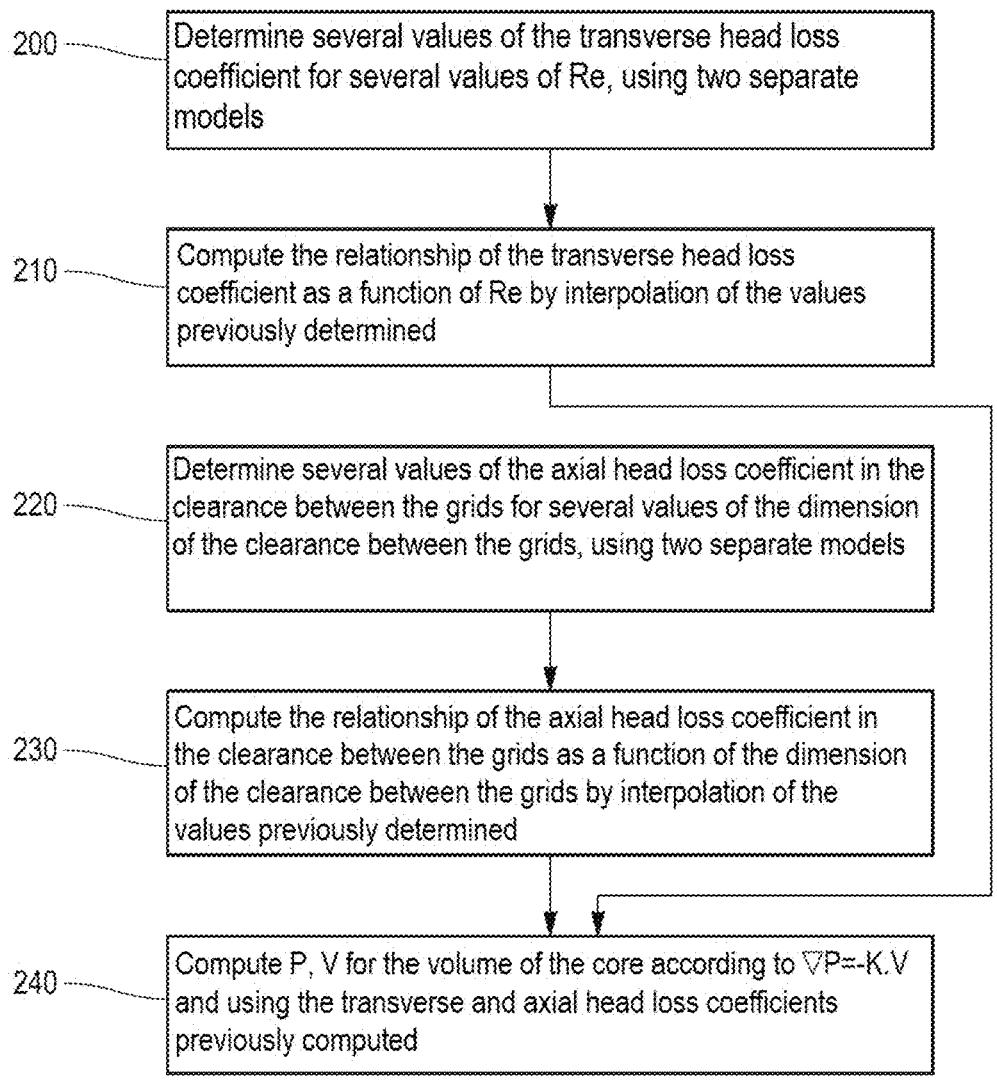
FIG. 9 is a flowchart of the simulation method according to a second aspect of the invention.

The method for simulating the flow of the fluid inside the vessel 11 of the nuclear reactor 10 according to a second aspect of the invention, independent of the first aspect previously described, will now be described using the flowchart of FIG. 9.

The simulation method according to the second aspect is designed to be implemented by a computer including a processor and a memory associated with the processor, the memory being able to store a second computer program product. The second computer program product includes software instructions, and implements the simulation method according to the second aspect when said software instructions are executed by the computer.

The simulation method according to the second aspect relates to a particular porous model based on the following equation:

$$\nabla P = -K \times V \qquad (9)$$

where P is the pressure of the fluid,

K is a matrix including a head loss coefficient, and

V is the vector including the component(s) of the speed of the fluid,

The simulation method according to the second aspect aims to compute the component(s) of a variable among the speed V of the fluid and the pressure P of the fluid, from the component(s) of the other variable among the speed V of the fluid and the pressure P of the fluid.

The head loss coefficients of the matrix K depend in particular on a transverse Reynolds number in the transverse direction X, Y and the position X, Y, Z in the core 12, for example among the following positions: in an assembly 40, between the peripheral rods 46 of two adjacent assemblies 40, or between the grids 56 of two adjacent assemblies 40.

For simplification, the matrix K is for example a diagonal matrix with 3 rows and 3 columns to simulate the flow in all 3 directions X, Y, Z. By convention, the diagonal terms of the matrix are denoted $K_{i,i}$, the other terms $K_{i,j}$ of the matrix K being null. Alternatively, the matrix K is not a diagonal matrix and all of the terms of the matrix are taken into account.

Each diagonal term $K_{i,i}$ verifies the following equation:

$$K_{i,i} = \frac{1}{2} \times \rho \times J_{i,i} \times V_i \qquad (10)$$

where $\rho$ is the density of the fluid, Vi is the component in the corresponding direction X, Y, Z of the speed of the fluid, and $J_{i,i}$ is a head loss coefficient per unit of length.

By convention, each head loss coefficient by unit of length depends on a so-called singular head loss component, associated with a local head loss phenomenon, and a so-called regular head loss coefficient, associated with a head loss phenomenon by friction on a wall.

During the initial step 200, a transverse head loss coefficient in the assemblies 40 is determined as a function of the transverse Reynolds number Re. The transverse head loss coefficient is associated with a single head loss and corresponds, by convention, to a local head loss in the transverse direction perpendicular to the axial direction of the flow of the fluid.

The transverse head loss coefficient is determined, for a value of a transverse Reynolds number Re in the transverse direction X, Y, preferably by comparison of the value of a variable, such as a hydraulic force in the transverse direction, computed for part of the assembly 40 using a first model, with the value of said variable computed for said part of the assembly 40 using the second model, different from the first model.

In the described example, the hydraulic force in the transverse direction is computed with the first model, such as the semi-detailed model previously described for the first aspect, for a value of the transverse Reynolds number Re, then the hydraulic force in the transverse direction is computed with the second model, such as that verifying equation (8), for the same value of the transverse Reynolds number.

During the computation using the second model, all of the head loss coefficients with the exception of the transverse head loss coefficient are set at a predetermined value, and the value of the transverse head loss coefficient determined for said value of the transverse Reynolds number Re is then the value for which the difference between the variable computed for part of the assembly 40 using the first model and said variable computed for the same assembly part using the second model is the lowest.

Several values of the transverse head loss coefficient are then determined for a plurality of comparisons done for different values of the transverse Reynolds number Re.

In the described example, similar head loss coefficients, denoted Kb, are determined during step 200, the transverse head loss coefficients being substantially equal to the singular head loss coefficients divided by a characteristic length of the flow in the assembly 40.

During the following step 210, the relationship of the transverse head loss coefficient as a function of the transverse Reynolds number Re is computed by interpolation of the plurality of values of the transverse head loss coefficient determined during step 200 for the plurality of comparisons done.

Interpolation is a mathematical approximation, for example by a polynomial function, exponential function, logarithmic function, power function, etc.

Additionally, at least one first grid among the grids 56 further comprises mixing elements, not shown, able to generate a flow having transverse speeds at the axial flow and at least one second grid among the grids 56 does not have any mixing elements.

A first relationship of the transverse head loss coefficient as a function of the transverse Reynolds number Re is then computed for a first part of the assembly 40 including the first grid.

A second relationship of the transverse head loss coefficient as a function of the Reynolds number Re is computed for a second part of the assembly 40 including the second grid, that second relationship being computed independently of the first relationship.

During step 220, an axial head loss coefficient in the clearance between the grids 56 is determined as a function of the size of the clearance between the grids BP1 in the transverse direction. The axial head loss coefficient in the clearance between the grids 56 is associated with a regular head loss and corresponds to a head loss by friction along the assemblies 40, more specifically along the grids 56 of said assemblies 40, in the axial direction Z of the flow of the fluid.

Similarly, the axial head loss coefficient in the clearance between the grids 56 is determined, for a value of the dimension of the clearance between the grids BP1, preferably by comparing a value of a variable, such as a hydraulic force in the transverse direction, computed for part of the assembly 40 using the first model, with the value of said computed variable for said part of the assembly 40 using the second model, different from the first model.

In the described example, the hydraulic force in the transverse direction is computed with the first model, while the semi-detailed model, for a value of the dimension of the clearance BP1 between the grids 56, then the hydraulic force in the transverse direction is computed with the second model, such as that verifying equation (9), for the same value of the dimension of the clearance BP1.

During the computation using the second model, all of the head loss coefficients with the exception of the axial head loss coefficient in the clearance BP1 between the grids 56 are set at a predetermined value, and the value of the axial head loss coefficient in the clearance BP1 between the grids 56 determined for said value of the dimension of the clearance BP1 is then the value for which the difference between the variable computed for part of the assembly 40 using the first model and said variable computed for the same assembly part 40 using the second model is the lowest.

Several values of the axial head loss coefficient in the clearance BP1 between the grids 56 are then determined for a plurality of comparisons done for different values of the dimension of the clearance BP1.

In the described example, friction coefficients along the assembly 40 in the axial direction, denoted $\lambda_{bp}^{G}$, are determined during step 220, the axial head loss coefficients in the clearance between the grids being substantially equal to the friction coefficients $\lambda_{bp}^{G}$ divided by the characteristic hydraulic length between two successive assemblies 40.

During the following step 230, the relationship of the axial head loss coefficient in the clearance between the grids as a function of the dimension of the clearance between the grids BP1 is computed by interpolation of the plurality of values of the axial head loss coefficient in the clearance between the grids, determined during step 220 for the plurality of comparisons done.

As before, the interpolation is for example done by a polynomial function, an exponential function, a logarithmic function, a power function, etc.

Additionally, the head loss coefficients other than the transverse head loss coefficient in the assemblies 40 and the axial head loss coefficient in the clearance BP1 between the grids 56 each have a predetermined value, which is for example constant. The values of the other head loss coefficients are for example predetermined experimentally, or using mechanical computations of the fluids, done elsewhere. For example, the axial head loss coefficient in the clearance between two peripheral rods 46 of two adjacent assemblies 40 is determined using the clearance BP2 between the respective peripheral rods 46 of two adjacent assemblies 40.

During the following step 240, the component(s) of a variable among the speed V of the fluid and the pressure P of the fluid are then computed from the component(s) of the other variable among the speed V of the fluid and the pressure P of the fluid, and according to the preceding equation (9).

The simulation method according to the second aspect of the invention does not require excessively high computing power due to the simplification of that porous model, in particular compared with the detailed model, or the semi-detailed model previously described for the first aspect of the invention.

Figure 10:
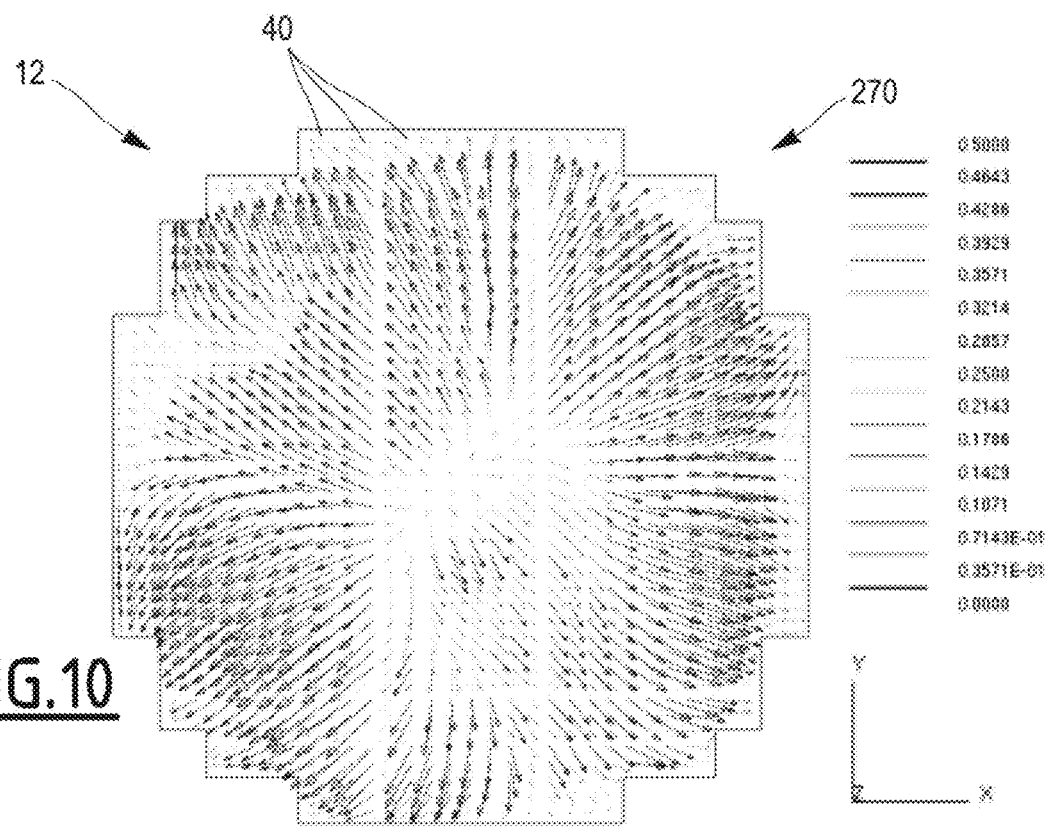
FIGS. 10 and 11 are views of the transverse speed, the axial speed, respectively, of the fluid inside the core and downstream from the first grid of the assemblies from a lower plate of the core, computed using the simulation method according to the second aspect of the invention.
Figure 11:
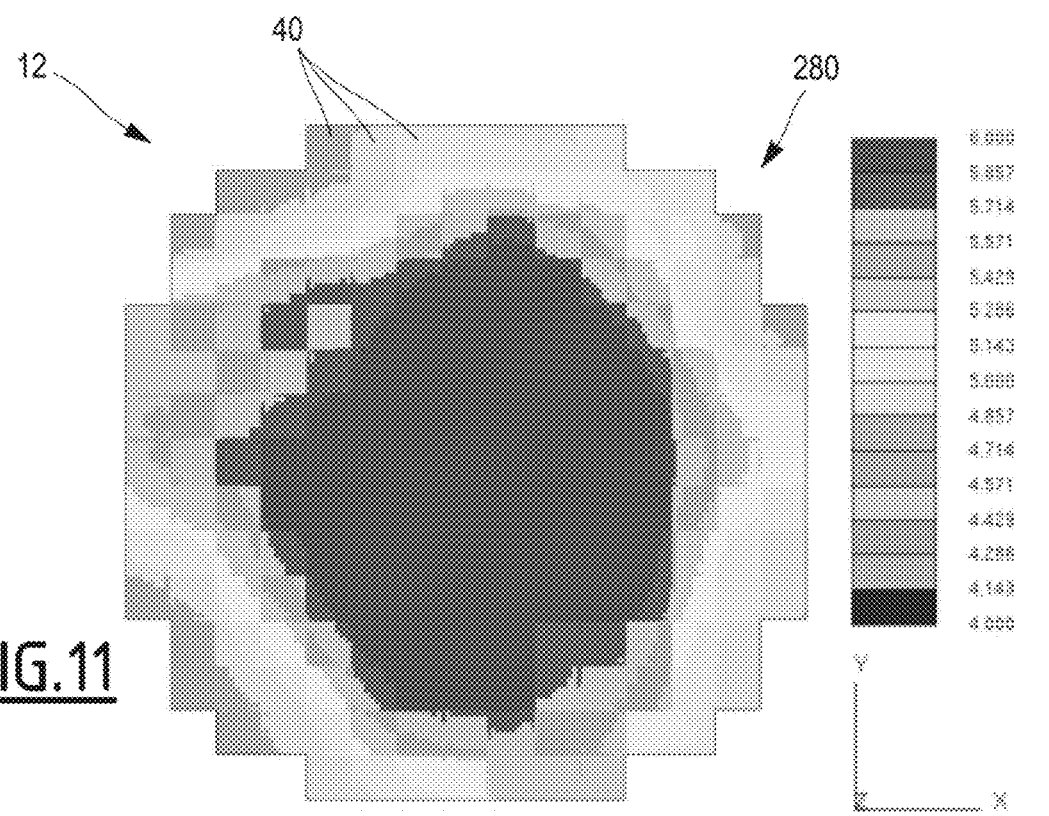

The simulation method according to the second aspect of the invention further makes it possible to offer better modeling of the flow, as shown by FIGS. 10 and 11, showing a view 270 of the transverse speed, and respectively, a view 280 of the axial speed, of the fluid inside the core 12 downstream from the first grid 56, these speeds being computed using the simulation method according to the second aspect of the invention.

In views 270 and 280, different speed values are shown in percentage of variation relative to a nominal value of the speed. The views 270 and 280 then show a good precision and good discrimination between the values of the speed computed according to the assembly 40 in question.

One can thus see that the simulation method according to the second aspect offers better modeling of the flow, while not requiring an excessively high computing power. One skilled in the art will also note that the simulation method according to the second aspect is independent of the simulation method according the first aspect, since it can be implemented independently of the simulation method according to the first aspect.

Additionally, the first and second aspects are combined in order to further improve the modeling of the flow, while limiting the necessary computing power. To that end, steps 120 and 130 of the simulation method according to the first aspect are performed by implementing steps 200 to 240 of the simulation method according to the second aspect, i.e., by using the particular porous model.

For the other types of reactors having a cooling fluid other than pressurized water, in particular reactors using a cooling gas or liquid (light water, heavy water, salt or molten metal), but also for pressurized water reactors, the intimate knowledge of the flows is used for example to evaluate the vibrational behavior of the assemblies 40 of the components.

The simulation method according to the first aspect, according to the second aspect or according to the first and second aspects combined in particular makes it possible to improve the computation of the mechanical deformation of the assemblies 40 of the core 12.

As is known per se, the mechanical deformation of each assembly 40 depends, inter alia, on the lateral hydraulic force in the transverse direction X, Y produced by the flow of a fluid inside the vessel 11, i.e., as a function of the components of the speed V and the pressure P of the fluid computed using the simulation method. The lateral hydraulic force in the transverse direction X, Y is for example applied to a structural model of the mechanical system optionally having nonlinearities, in order to compute the response of said system to a load applied in the form of static or dynamic forces or movements. In the described example, the deformations of the assemblies 40 are computed by applying lateral hydraulic forces computed using the simulation method to a model of the core 12 of the "beams" type with two, and preferably three, dimensions.

Figure 12:
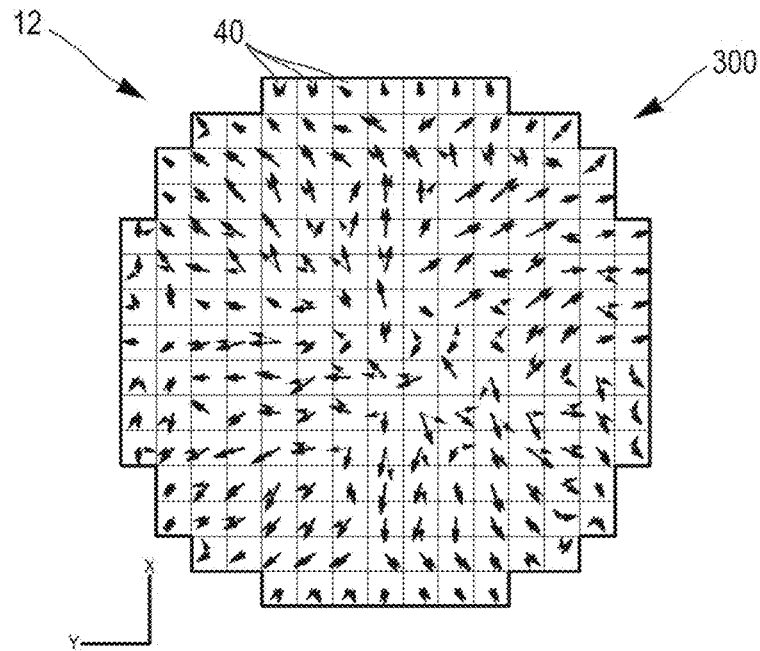
FIGS. 12 and 13 are diagrammatic top views of deformations of the assemblies obtained on the one hand using a deformation computation method implementing the first and second aspect of the simulation method according to the invention, and on the other hand, using measurements done, for the third grid of the assemblies from a lower plate of the core, and respectively for the eighth grid from said lower plate.
Figure 13:
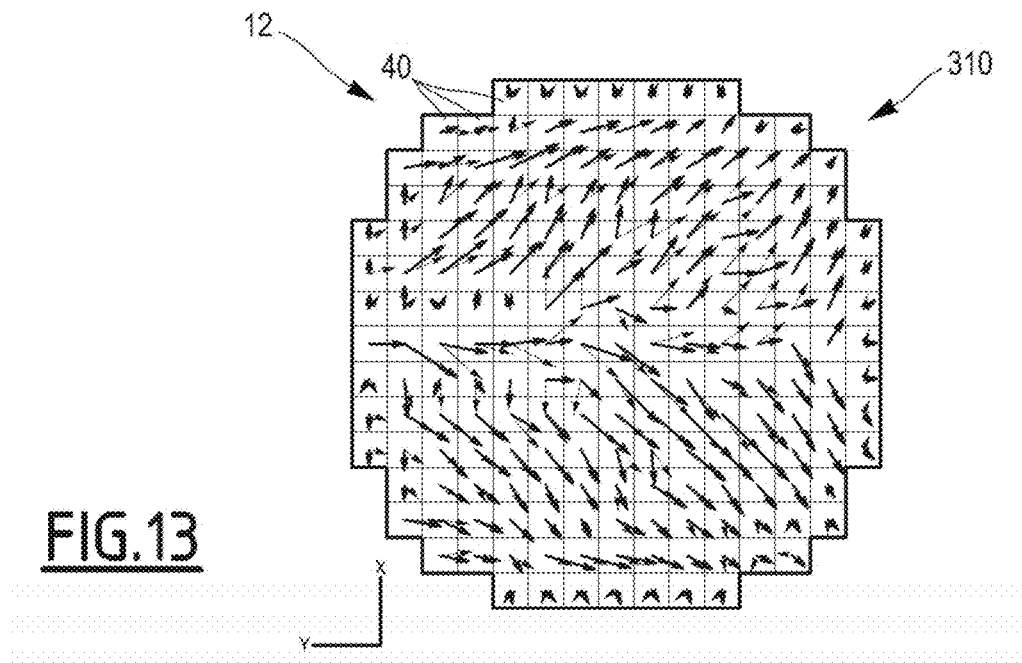

The mechanical deformations of the assemblies 40 computed using the method according to an embodiment of the invention for computing the deformation are shown in FIGS. 12 and 13. The view 300 diagrammatically shows, in top view, deformations of the assemblies obtained, on the one hand, using the deformation computation method implementing the first and second aspect of the simulation method according to the invention, and on the other hand, using measurements done, for the third grid 56, from the lower plate 41A of the core 12. The view 310 is a view similar to the view 300, but for the eighth grid 56 from said lower plate 41A.

In the views 300 and 310, the arrows in thick lines correspond to deformations of the assemblies 40 computed using the computation method according to an embodiment of the invention, while the arrows in thin lines correspond to measured values of said deformations. The comparison of the views 300 and 310 shows that, contrary to the state of the art, the orientations of the deformations obtained by simulation and measured are globally an agreement. The differences are relatively small between the values obtained by simulation and the measured values. One skilled in the art will observe that even if the sizes of the arrows in think lines and thin lines are relatively different for some of the assemblies 40, it was previously not possible to compute the correct orientation of the deformations of the assemblies 40 from simulations of the flow of the fluid in the core 12 done using the models of the state of the art.

Figure 14:
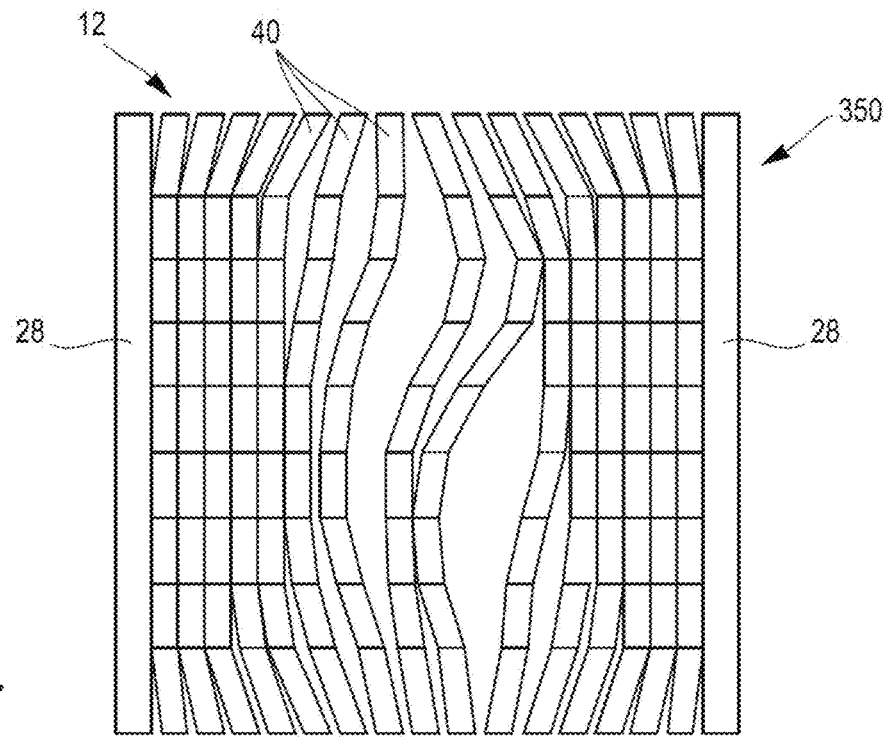
FIGS. 14 and 15 are diagrammatic side view illustrations of the deformations of the assemblies obtained using the deformation computation method implementing the first and second aspects of the simulation method according to the invention, and using measurements done, for a row of assemblies of the core, respectively.
Figure 15:
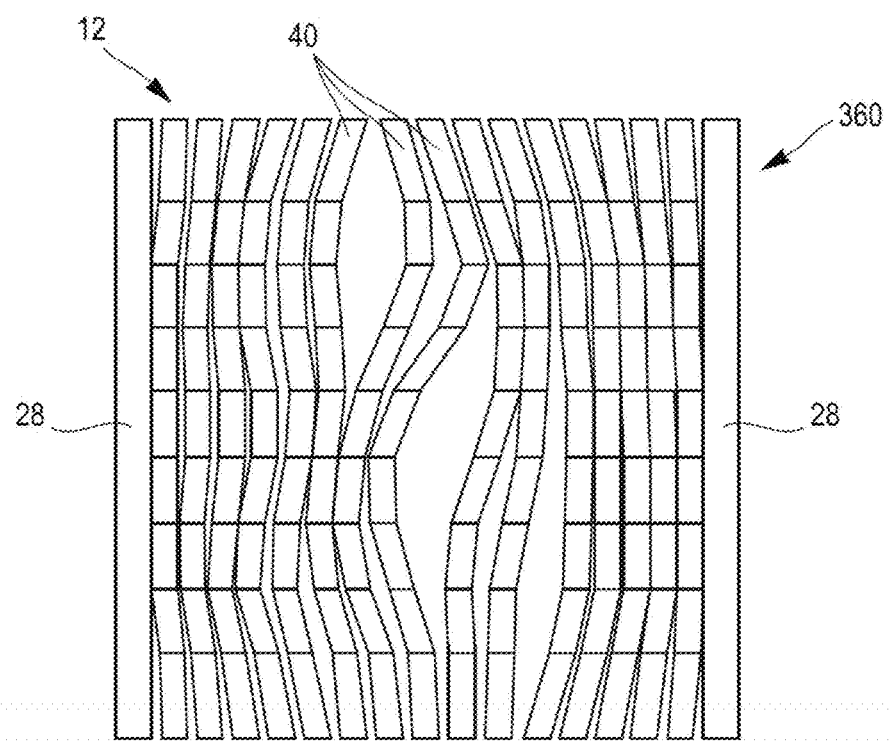

In FIGS. 14 and 15, a view 350 shows, in side view, the deformations of the assemblies 40 obtained for a row of assemblies of the core 12 using the deformation computation method implementing the first and second aspect of the simulation method according to the invention, and a view 360 shows, still in side view, the deformations of the assemblies 40 obtained using measurements done for the same row of assemblies of the core 12.

The comparison of FIGS. 14 and 15 shows that the differences are relatively small between the values obtained by simulation and the measured values. One skilled in the art will observe that even if the forms of the deformations are slightly different for some of the assemblies 40, it was previously not possible to determine the deformation of the assemblies 40 from the simulation of the flow of the fluid in the core 12 using the models of the state of the art.

Additionally, at a given moment, the deformation state of the assemblies 40 present in the vessel 11 computed using the computation method for the mechanical deformation of the assemblies is reintroduced into the simulation model for the fluid flow within the vessel 11 taking into account the new deformations of the assemblies 40, i.e., the evolution of the clearances BP1 between the respective grids 56 of the assemblies 40 and the clearances BP2 between the respective peripheral rods 46 of the assemblies 40. The method for simulating the flow of the fluid next computes the hydraulic forces, in particular lateral hydraulic forces in the transverse direction X, Y, for the assemblies 40 of the core 12. These hydraulic forces are taken into account in the mechanical model of the core 12, and through a mechanical computation, the resulting deformations at the following moment are deduced therefrom. These deformations are next iteratively reintroduced into the hydraulic model.

The iterative linking of the hydraulic model and the mechanical model makes it possible to further improve the simulation of the evolution of the deformations of the assemblies 40 by fluid-structure interaction.

One can thus see that the method for simulating the flow of the fluid inside the vessel 11 of the reactor 10 according to the first aspect and/or the second aspect offers better modeling of the flow, in particular to improve the computation of the mechanical deformation of the assemblies 40 of the core 12, while not requiring an excessively high computing power.

What is claimed is:

1. A method for simulating the flow of a fluid inside a vessel of a nuclear reactor, the nuclear reactor comprising the vessel and a core positioned inside the vessel, the core including nuclear fuel assemblies, each assembly extending in an axial direction and including nuclear fuel rods and at least one grid for maintaining the rods, each assembly being spaced apart from another assembly by a clearance between the grids in a transverse direction perpendicular to the axial direction, the fluid being able to flow inside the core, the method comprising, implementing by a computer including a processor and a memory associated with the processor, the following steps:

i) determining head loss coefficients in the core by determining a transverse head loss coefficient in the assemblies as a function of a transverse Reynolds number in the transverse direction, and determining an axial head loss coefficient in the clearance as a function of the dimension of the clearance in the transverse direction;

ii) computing the pressure of the fluid and component(s) of a speed of the fluid in the core, using the following equation:

$$\nabla P = -K \times V \qquad 5$$

where $\nabla$ is the order one spatial derivation nabla operator,
P is the component of the pressure of the fluid,
K is a matrix including the head loss coefficients determined during step i), and
V is a vector including the component(s) of the speed of the fluid; and
generating a simulation of the flow of the fluid inside the core such that the fluid is simulated to flow inside the core in accordance with values of the pressure of the fluid and the component(s) of the speed computed in step ii).

2. The method as recited in claim 1, wherein, during step i), the transverse head loss coefficient is determined, for a value of the transverse Reynolds number, by comparison with a variable computed for a part of the assembly using a first model, with the variable computed for the part of the assembly using a second model, separate from the first model.

3. The method as recited in claim 2, wherein the relationship of the transverse head loss coefficient as a function of the transverse Reynolds number is computed by interpolation of several values of the transverse head loss coefficient determined for a plurality of comparisons performed.

4. The method as recited in claim 2, wherein at least one first grid among the grids- further comprises additional mixers able to generate a flow having at least one transverse speed in the transverse direction, and at least one second grid among the grids does not include additional mixers, and wherein a first relationship of the transverse head loss coefficient as a function of the transverse Reynolds number is computed for a first part of the assembly including the first grid, and a second relationship of the transverse head loss coefficient as a function of the transverse Reynolds number is computed for a second part of the assembly including the second grid.

5. The method as recited in claim 1, wherein, during step i), the axial head loss coefficient in the clearance is determined, for a value of the dimension of the clearance, by comparison with a variable computed for a part of the assembly using a first model, with the variable computed for the part of the assembly using a second model, different from the first model.

6. The method as recited in claim 5, wherein the relationship of the axial head loss coefficient in the clearance as a function of the dimension of the clearance is computed by interpolation of several values of the axial head loss coefficient in the clearance between the grids, determined for a plurality of comparisons performed.

7. The method as recited in claim 1, wherein during step i), the head loss coefficients other than the transverse head loss coefficient in the assemblies and the axial head loss coefficient in the clearance between the grids each have a predetermined value.

8. The method as recited in claim 1, wherein the vessel includes a fluid inlet orifice and a fluid outlet orifice, the core including a lower plate and an upper plate, the assemblies extending between the lower and upper plates, the core having a volume delimited by first and second interfaces in the axial direction, the first and second interfaces respectively corresponding to the lower and upper plates, the method further comprising:

determining at least one additional volume inside the vessel, the additional volume being outside the core volume and situated at one end thereof in the axial direction, the additional volume being delimited by two interfaces in the axial direction, one of the two interfaces of the additional volume being the first interface or the second interface, computing, for the additional volume and using the mass balance, movement quantity balance and energy balance equations of the fluid, the pressure of the fluid and the component(s) of the speed of the fluid, from an initial value of the speed or pressure in one of the interfaces of the additional volume and an initial value of the speed or the pressure in the other of the interfaces of the additional volume, computing, for the core volume, the pressure of the fluid and the component(s) of the speed of the fluid, from an initial value of the speed or pressure of the fluid in the first interface and an initial value of the speed or pressure of the fluid in the second interface and according to step ii), and the computation of the pressure of the fluid and of the component(s) of the speed of the fluid is first done for a first volume among the additional volume and the core volume, in the interface among the first and second interfaces that is shared by the additional volume and the core volume, then the pressure of the fluid and of the component(s) of the speed of the fluid is computed for the second volume among the additional volume and the core volume, the initial value of the speed or pressure at the interface shared by the additional volume and the core volume and for that computation step associated with the second volume then being the value of the corresponding variable among the speed and the pressure previously computed at the interface for the first volume.

9. The method as recited in claim 8, wherein the mass balance, movement quantity balance and energy balance equations are respectively as follows:

$$\frac{\partial \rho}{\partial t} + \nabla(\rho V) = S_m$$

$$\frac{\partial (\rho V)}{\partial t} + \nabla \cdot (\rho V \otimes V) = -\nabla P + \nabla \cdot \tau + \rho F + S_i$$

$$\frac{\partial (\rho E)}{\partial t} + \nabla \cdot [(\rho E + P) \times V)] = \nabla \cdot (\tau \cdot V) + \rho F \cdot V - \nabla \cdot Q + R + S_e$$

where $\nabla$ is the order one spatial derivation nabla operator, P is the component of the pressure of the fluid, V is a vector including the component(s) of the speed of the fluid, $\rho$ is the density of the fluid, t is the time, $\tau$ is the tensor of the viscous stresses, F is a vector including the component(s) of the resultant of the mass forces exerted in the fluid, E is a total energy per unit of mass, Q is a vector including the component(s) of the heat lost by thermal conduction, R is the volume heat loss due to radiation, $S_m$ is the mass source, $S_i$ is the movement quantity source, and $S_e$ is the energy source.

10. The method as recited in claim 8, wherein:
the computation step for the first volume is reiterated with, as initial value of the speed or the pressure at that shared interface and for that reiteration of the computation step associated with the first volume, the value of the corresponding variable among the speed and pressure computed during a step carried out previously in that interface for the second volume, and the computation step for the second volume is reiterated with, as initial value of the speed or the pressure at that shared interface and for that reiteration of the computation step associated with the second volume, the value of the corresponding variable among the speed and pressure computed previously in that interface for the first volume during the reiteration.

11. The method as recited in claim 8, wherein two additional volumes are determined during the determining step: an additional upstream volume situated upstream from the core volume in the flow direction of the fluid and a downstream additional volume situated downstream from the core volume in the flow direction of the fluid, the first interface of the core volume being shared with the additional upstream volume and the second interface of the core volume being shared with the additional downstream volume, and wherein the computation of the pressure of the fluid and the component(s) of the speed of the fluid is done:

a) in the first interface, first for a first volume among the upstream additional volume and the core volume, then for a second volume among the additional upstream volume and the core volume, the initial value of the speed or the pressure in the first interface for the computation step associated with the second volume being the corresponding variable among the speed and pressure previously computed in the first interface during the computation step associated with first volume, and b) in the second interface, first for a third volume among the additional downstream volume and the core volume, then for a fourth volume among the additional downstream volume and the core volume, the initial value of the speed or the pressure in the second interface for the computation step associated with the fourth volume being the corresponding variable among the speed and the pressure previously computed in the second interface during the computation step associated with the third volume.

12. A non-transitory computer-readable medium including a computer program product including software instructions which, when executed by a computer, implement the simulation method as recited in claim 1.

13. A method for calculating a mechanical deformation of at least one assembly of a core of a nuclear reactor, the nuclear reactor comprising a vessel and the core positioned inside the vessel, the mechanical deformation of each assembly depending on the flow of a fluid inside the vessel, the method comprising:

simulating the flow of the fluid with the simulation method as recited in claim 1.

14. A non-transitory computer-readable medium including a computer program product including software instructions which, when executed by a computer, implement the method as recited in claim 13.

15. The method as recited in claim 1 wherein the nuclear reactor is a light water reactor.

* * * * *